United States Patent [19]

Yokota

[11] Patent Number: 4,783,156

[45] Date of Patent: Nov. 8, 1988

[54] OPTICAL SYSTEM FOR ALTERING THE DIRECTION OF THE VISUAL FIELD IN ENDOSCOPES

[75] Inventor: Akira Yokota, Sagamihara, Japan

[73] Assignee: Olympus Optical Co., Ltd., Tokyo, Japan

[21] Appl. No.: 45,815

[22] Filed: May 4, 1987

[30] Foreign Application Priority Data

May 7, 1986 [JP] Japan .............................. 61-68302[U]

[51] Int. Cl.$^4$ .............................................. G02B 23/02
[52] U.S. Cl. ..................................... 350/445; 350/286
[58] Field of Search ................................. 350/445, 286

[56] References Cited

U.S. PATENT DOCUMENTS 4,138,192  2/1979  Yamasita.
4,398,811  8/1983  Nishioka et al..

FOREIGN PATENT DOCUMENTS 2458306  12/1983  Fed. Rep. of Germany.
60-140313  7/1985  Fed. Rep. of Germany.
3447894  7/1985  Fed. Rep. of Germany.
55-101239  8/1980  Japan.

Primary Examiner—John K. Corbin
Assistant Examiner—Rebecca D. Gass
Attorney, Agent, or Firm—Cushman, Darby & Cushman

[57] ABSTRACT

In order to make it possible to observe the image of an object as an erect (correct) image and also to construct the entire device in a compact size, the optical system for altering the direction of the visual field for use in endoscopes comprises visual field direction altering means composed of the combination of a first prism having a light-incidence surface normal to the optical axis of the incident light and a second prism having a light-emitting surface normal to the optical axis of the optical system located rearwardly of the first prism, and arranged so that the vertical angle between the light-incidence surface and the light-emitting surface of the first prism and the vertical angle between the light-incidence surface and the reflection surface of the second prism are structured, respectively, to satisfy certain specific conditions. This visual field direction altering optical system can be constructed as an adapter removably mounted to the foremost end portion of the endoscope.

9 Claims, 4 Drawing Sheets

OPTICAL SYSTEM FOR ALTERING THE DIRECTION OF THE VISUAL FIELD IN ENDOSCOPES

BACKGROUND OF THE INVENTION (a) Field of the invention

The present invention relates to an endoscope, and more particularly to an optical system for altering the direction of the visual field in endoscopes.

(b) Description of the prior art

As one of the conventional optical systems for altering the direction of the visual field which are of such a type as mentioned above, the optical system for side viewing which is stated in, for example, Japanese Patent Preliminary Publication No. Sho 55-101239 is of the arrangement as shown in FIG. 1 that, in an optical system of the retrofocusing type endoscope, the light bundle coming from an object impinges, via a concave lens 1, onto a roof prism 2 which is constructed with a highly refractive glass block, and that the light bundle emitting from this roof prism 2 is focused on an end surface of an image guide 4 by an objective lens system 3 to be transmitted to the other end of this image guide, and it is characterized by a parallel plate 5 inserted between the concave lens 1 and the roof prism 2 based on the above-mentioned fundamental arrangement. Whereby, it is said that the adjustment of decentration or the holding of the prism can be accomplished with an enhanced precision, and also that the effective light bundle is reduced in size to achieve the realization of reduction of the outer diameter of the concave lens 1.

Also, as another example of the optical systems for altering the direction of the visual field, the optical system for oblique viewing stated in, for example, Japanese Patent Preliminary Publication No. Sho 60-140313 is constructed, as shown in FIG. 2, by arranging the light-incidence surface of the first prism 6 of the visual field direction altering means at right angles relative to the direction of the visual field, and arranging the first reflection surface 7a of the second prism 7 parallel with the axial direction of the endoscope, and also arranging the interface layer 8 of the first prism 6 and of the second prism 7 to form an acute angle with the axial direction of the endoscope, and along therewith, by using said interface layer 8 to serve as the second reflection surface 7b, and by bonding the interface layer 8 with a bonding agent. Whereby, it is said that the processing of the prisms and the fabrication of the objective lens are facilitated, and that the loss of the amount of decentration and of the amount of light due to the play among these components can be prevented.

However, in the abovesaid optical system for side viewing, a roof prism 2 is employed. Therefore, in order to secure a margin or room between the light bundle on the incidence side and the roof (Dach) surface, the distance from the end surface on the light-incidence side of the roof prism 2 up to the optical axis of the objective lens 3 and the optical axis of the image guide 4 requires to be set at a certain value or greater. For this reason, the outer diameter of the endoscope becomes as large as about 10 mm or greater, thus limiting the reduction of the size of the endoscope. Also, in the abovesaid optical system for side viewing, there is a feature that a pair of prisms 6 and 7 are used to realize an erect (correct) image without the employment of a roof prism. However, there has never been encountered in the past an example which has developed the above-mentioned feature into the side-viewing optical system for practical use.

SUMMARY OF THE INVENTION

It is, therefore, the primary object of the present invention to provide an optical system for altering the direction of the visual field for endoscopes, which is arranged to be capable of forming, in a further compact size, the side viewing type optical system which allows an observation of an erect image of an object by means of a pair of prisms.

According to the present invention, this object is attained by comprising means for altering the direction of the visual field which is constructed by the combination of a first prism having a light-incidence surface which is normal to the optical axis of the optical system located rearwardly of said first prism, and by the following arrangement that the first prism is so formed that its vertical angle constituted by its light-incidence surface and light-emitting surface is determined so as to satisfy the following formula:

$$\theta_1 < \sin^{-1}\left(\frac{\eta_M}{\eta_{G1}}\right)$$

when the angle of incidence of the upper marginal light rays in the maximum height of the image relative to the light-emitting surface is assumed to be $\theta_1$, while the light-incidence surface of the second prism is substantially parallel with the light-emitting surface of the first prism, and further that a third surface of the second prism other than the light-incidence surface and the light-emitting surface is a reflection surface and that, when the abovesaid light rays are reflected at said reflection surface, the angle of incidence of this reflected light relative to the light-incidence surface of the second prism is assumed to be $\theta_2$, the vertical angle formed by the light-incidence surface and the reflection surface is determined so as to establish the following relationship:

$$\theta_2 > \sin^{-1}\left(\frac{\eta_M}{\eta_{G2}}\right)$$

wherein:

$\eta_{G1}$, $\eta_{G2}$ and $\eta_M$ represent the refractive indices, respectively, of the first prism, the second prism and of the material forming the layer of interface between the first and the second prisms.

According to the optical system of the present invention, the upper marginal light on the incidence side impinges onto the first prism, and also impinges onto the interface layer at an incidence angle $\theta_1$ and after passing therethrough, enters into the second prism to be reflected at its reflection surface, and further impinges again onto the interface layer at an incidence angle $\theta_2$, and undergoes a total reflection thereat to emit from the light-emitting surface. Accordingly, if the light-incidence surface of the first prism and the light-emitting surface of the second prism form right angles, the result is that the optical path is altered by 90°, and moreover because the light is reflected twice, the image which is transmitted is an erect (correct) image, and the distance between the optical axis of the emitting light and the light-incidence surface can be reduced.

Furthermore, according to the optical system of the present invention, it should be noted that, by altering the respective vertical angles of the first and second prisms, some forward or rearward oblique viewing is made feasible.

This and other objects as well as the features and the advantages of the present invention will be apparent from the following detailed description when taken in conjunction with the accompanying drawings.

DETAILED DESCRIPTION OF THE PREFERRED EMBODIMENTS

Figure 1:
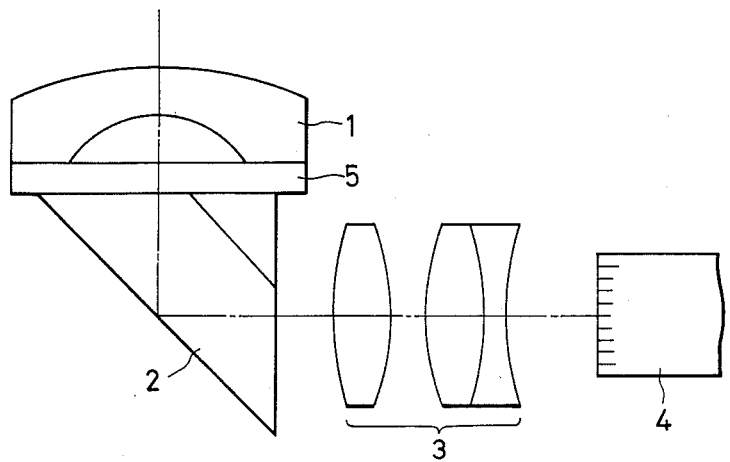
FIGS. 1 and 2 are illustrations showing mutually different examples of the conventional optical systems for altering the direction of the visual field in endoscopes.
Figure 2:
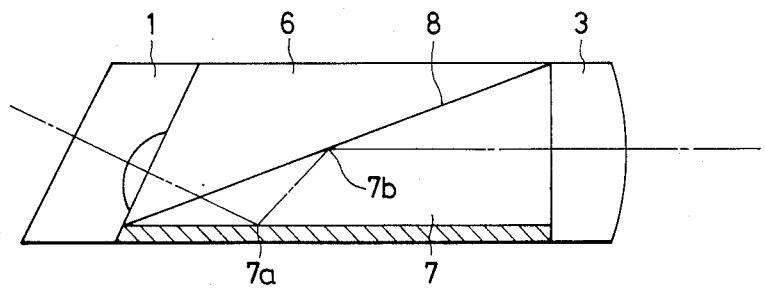
Figure 3:
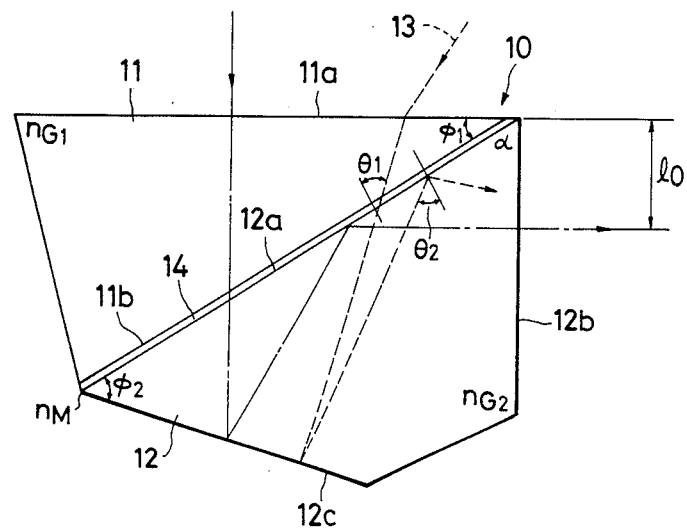
FIG. 3 is an illustration showing the basic structure of the prism for altering the direction of the visual field, which is employed in the optical system for altering the direction of the visual field in endoscopes according to the present invention.
Figure 4:
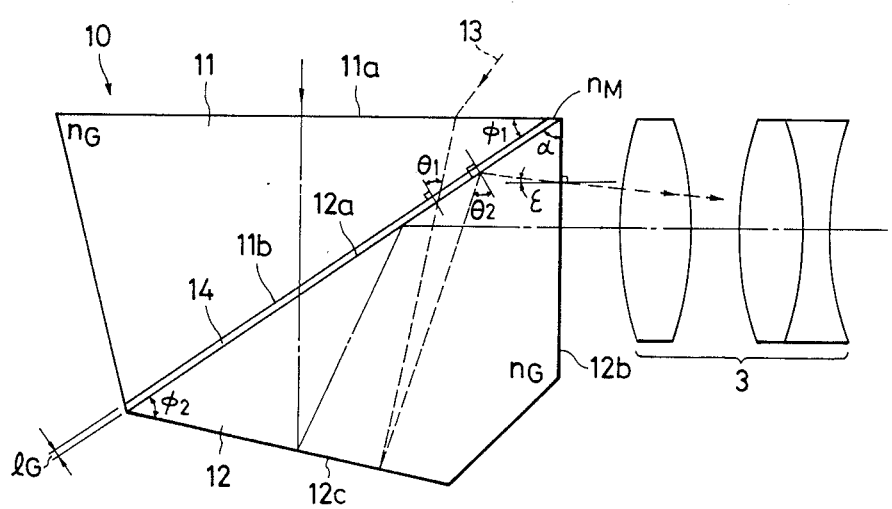
FIGS. 4 to 6 are illustrations showing mutually different embodiments of the visual field direction altering prism according to the present invention.

Referring first to FIGS. 3 and 4, a visual field direction altering means 10 is constructed by bonding together a first prism 11 having a light-incidence surface 11a which is normal to the optical axis of an incident light and a second prism having a light-emitting surface 12b which is normal to the optical axis of an objective lens 3 which is provided rearwardly of the first prism.

The first prism 11 is such that, when the angle of incidence formed by the upper marginal light rays 13 for the maximum image height relative to the light-emitting surface 11b is assumed to be $\theta_1$, the vertical angle $\theta_1$ of this prism between the light-incident surface 11a and the light-emitting surface 11b is determined so as to establish the following relationship:

$$\theta_1 < \sin^{-1}\left(\frac{\eta_M}{\eta_{G1}}\right);$$

and the light-incidence surface 12a of the second prism 12 is substantially parallel with the light-emitting surface 11b of the first prism 11, and a third surface 12c of the second prism 12 other than the light-incidence surface 12a and the light-emitting surface 12b thereof is a reflection surface. When the abovesaid light rays are reflected at this reflection surface 12c, and when the angle of incidence of the reflected light rays relative to the light-incidence surface 12a is assumed here to be $\theta_2$, the vertical angle $\theta_2$ formed by the light-incidence surface 12a and the reflection surface 12c is determined so as to establish the following relationship:

$$\theta_2 > \sin^{-1}\left(\frac{\eta_M}{\eta_{G1}}\right),$$

wherein:

$\theta_{G1}$, $\theta_{G2}$ and $\theta_M$ represent the refractive indices, respectively, of the first prism 11, the second prism 12 and the material M of the interface layer (bonding agent layer, etc.) 14 between the two prisms 11 and 12.

In this embodiment, both the first and second prisms 11 and 12 are constructed with a same single material, so that $\theta_{G1} = \theta_{G2}$. The thickness $l_G$ of the interface layer 14 is selected to be $l_G \geq 500$ nm. Now, let us here assume that the angle formed by the optical axis and the upper marginal light rays 13 is $\epsilon$ and that the angle formed by the light-incidence surface 12a and the light-emitting surface 12b of the second prism 12 is $\alpha$, there are obtained the relationships:

$$\theta_1 = 90° - \alpha + \epsilon, \theta_2 = \alpha - \epsilon, \theta_1 + \theta_2 = 90°.$$

The visual field direction altering optical system according to the present invention is constructed as described above. Accordingly, the upper marginal light rays 13 on the light-incidence side impinge onto the first prism 11, and impinges onto the interface layer 14 at an angle of incidence $\theta_1$ and transmit therethrough, and then enter into the second prism 12 and are reflected at the reflection surface 12c, and impinge again onto the interface layer 14 at an incidence angle $\theta_2$ this time, and are totally reflected thereat, and emit from the light-emitting surface 12b. In this case, because the light-incidence surface 11a of the first prism 11 is normal to the light-emitting surface 12b of the second prism 12, it is possible to effect the alteration of the optical path for an angle of 90°. Moreover, because the light bundle is reflected twice, the image of the object for observation is transmitted as a normal (correct) image, and furthermore it is possible to reduce the distance between the optical axis following the emission of light and the light-incidence surface 11a. Accordingly, it becomes possible to dispose the objective lens system 3 at a position closer to the peripheral portion of the endoscope within the predetermined range of the outer diameter of this endoscope. As a result, the layout of the illumination system, the channel, etc. becomes easy. In addition, the outer diameter per se of the endoscope can be reduced as compared with the instance wherein a roof prism is used, and thus the endoscope as a whole can be constructed in a compact size. Also, because the film thickness $l_G$ of the interface layer 14 is set to be greater than the wavelength of the visible rays, the escape of the light rays to the total reflection side can be prevented.

It should be noted here that the material M of the interface layer 14 may be either a bonding agent, a layer of air, a vapor-deposition film, a thin glass plate, etc. provided that the above-mentioned conditions are satisfied.

Also, the reflection surface 12c is desirably covered with a metal reflection film. Furthermore, the entire structure may be an optical system for oblique viewing.

It should be noted here also that, according to this structure, by altering the vertical angles $\phi_1$, $\phi_2$ of the first prism 11 and the second prism 12, some degree of forward as well as rearward oblique viewing is feasible.

Figure 5:
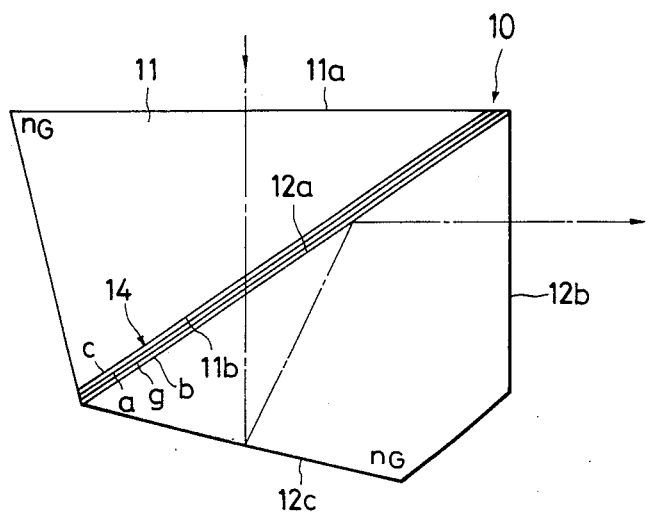

FIG. 5 shows a visual field direction altering means 10 as a second embodiment. This embodiment is constructed by forming the interface layer 14 in three layers by using three kinds of vapor-deposition materials a, g and b which satisfy the below-mentioned conditions. That is, assuming $\eta_G$, $\eta_c$, $\eta_a$, $\eta_g$, and $\eta_b$ as the refractive indices, respectively, of the first and the second prisms 11, 12, the bonding agent c, and the vapor-deposition materials a, g and b; and assuming $l_a$, $l_g$ and $l_b$ as the optical film thicknesses, respectively, of the vapordeposition materials a, g and b, the following relationships are set:

$\eta_c > \eta_a > \eta_g < \eta_b < \eta_G$
200 nm $\leq l_a \leq$ 350 nm
1000 nm $\leq l_g \leq$ 2000 nm
150 nm $\leq l_b \leq$ 300 nm.

As an example of concrete numerical values for $\eta_c$, $\eta_a$, $\eta_g$, $\eta_b$ and $\eta_G$, there are: $\eta_c = 1.565$; $\eta_a = 1.46$; $\eta_g = 1.38$; $\eta_b = 1.6$; and $\eta_G = 1.883$.

Figure 6:
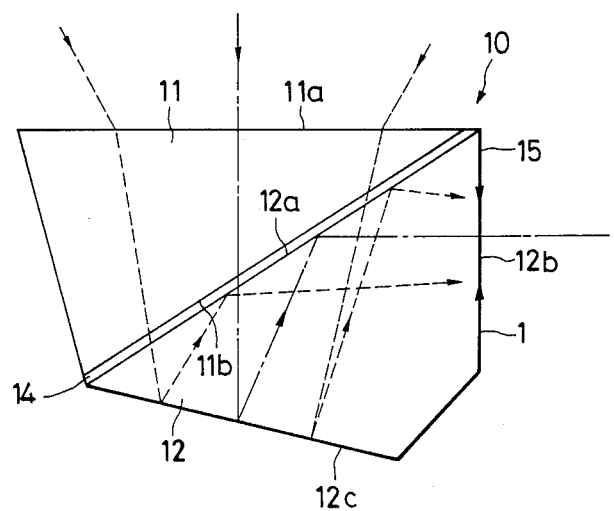

FIG. 6 shows a visual field direction altering means 10 as a third embodiment. This instant embodiment is constructed by forming a stop or diaphragm 15 rearwardly of the light-emitting end surface of the second prism 12.

Figure 7:
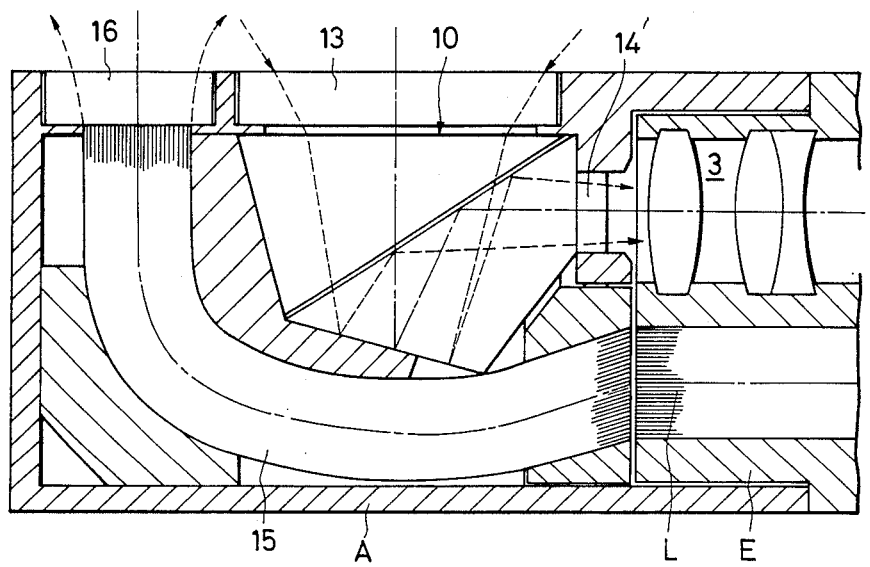
FIGS. 7 to 9 are illustrations showing mutually different embodiments of the optical systems for altering the direction of the visual field in endoscopes according to the present invention.

FIG. 7 shows a first embodiment of the visual field direction altering optical system according to the present invention. Symbol A represents an adapter of a substantially cylindrical shape removably mounted on the foremost end portion E of an endoscope housing therein a light guide L and an objective lens 3. This adapter A houses therein a visual field direction altering optical system which is comprised of a cover glass (parallel plate) 13, the visual field direction altering means 10 of FIG. 4 and a lens 14' of FIG. 7 and an illumination system comprised of a light guide 15 and a cover glass 16. The visual field direction altering optical system and the illumination system are disposed within the adapter A in such a manner that, when the adapter A is mounted in correct fashion onto the foremost end portion E of the endoscope as illustrated, the optical axis of the lens 14' coincides with the optical axis of the objective lens system 3 and that the light-incidence end surface of the light guide 15 is alinged with the light-emitting end surface of the light guide L on the endoscope side.

Figure 8:
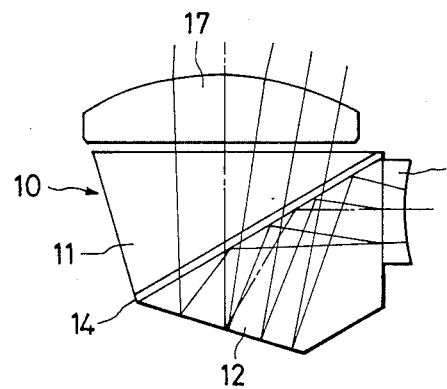

FIG. 8 shows a second embodiment of the visual field direction altering optical system according to the present invention. In this instant embodiment, the visual field direction altering optical system is comprised of a positive lens 17, the visual field direction altering means 10 of FIG. 4 and a negative lens 18.

Figure 9:
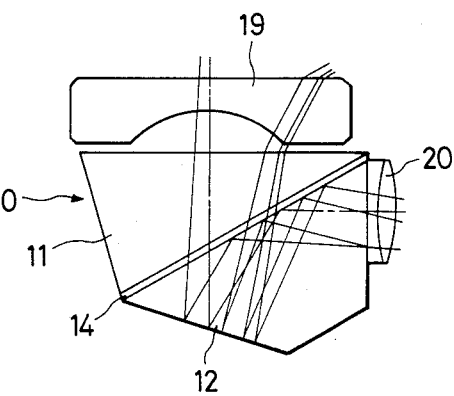

FIG. 9 shows a third embodiment of the visual field direction altering optical system according to the present invention. In this embodiment, the visual field direction altering optical system is comprised of a negative lens 19, the visual field direction altering means 10 of FIG. 4 and a positive lens 20.

The visual field direction altering optical systems shown in FIGS. 8 and 9 are each housed within the adapter A in a manner similar to the embodiment shown in FIG. 7 and are each arranged so that they can each be mounted onto the foremost end portion of the endoscope together with the illumination system. By arranging the visual field direction altering optical system as the adapter type as described above, it is possible to form a compact system by the use of a common visual field direction altering means 10 of a capacity ranging from a wide angle to a narrow angle.

As stated above, according to the optical system of the present invention for altering the direction of the visual field, the objective lens system can be disposed at a position closer to the peripheral portion of the endoscope within the predetermined range of the outer diameter thereof. Thus, the layout of the illumination system, the channel, etc. becomes easy. The outer diameter per se of the endoscope can be reduced in size as compared with the instance in which a roof prism is used, and thus the entire apparatus can be constructed in a compact size. Also, by fabricating the visual field direction altering optical system of the present invention in the adapter style, it is possible to construct a compact system by the use of a common prism having a capacity ranging from a wide angle to a narrow angle. Also, the visual field direction altering optical system of the present invention is especially effective for use in a device having a large side view angle or a large angle of inclination wherein the effective diameter of the visual field direction altering prism (i.e. the effective diameter of the light-incidence surface toward the first prism) will not cross the optical axis of the endoscope.

What is claimed is:

1. An optical system for altering the direction of the visual field in endoscopes, comprising visual field direction altering means composed of a first prism having a first light-incidence surface normal to an optical axis of incident light and a first light-emitting surface crossing said first light-incidence surface, and a second prism having a second light-incidence surface facing, via an interface layer, said first light-emitting surface substantially in parallel, a reflection surface crossing said second light-incidence surface, and a second light-emitting surface crossing said second light-incidence surface and normal to an optical axis of an objective lens system, wherein:

said first prism is so formed that its vertical angle between said first light-incidence surface and said first light-emitting surface is set to establish the relationship $$\theta_1 < \sin^{-1}\left(\frac{\eta_M}{\eta_{G1}}\right)$$

when the angle of incidence of an upper marginal light rays corresponding to the maximum height of an image relative to said first light-emitting surface is assumed to be $\theta_1$, and said second prism is so formed that its vertical angle between said second light-incidence surface and said reflection surface is set to establish the relationship $$\theta_2 > \sin^{-1}\left(\frac{\eta_M}{\eta_{G2}}\right)$$

when the angle of incidence of said upper marginal light rays reflected at said reflection surface relative to said second light-incidence surface is assumed to be $\theta_2$, wherein $\eta_{G1}$, $\eta_{G2}$ and $\eta_M$ represent the refractive indices of said first prism, said second prism and said interface layer, respectively.

2. An optical system for altering the direction of the visual field in endoscopes according to claim 1, wherein:

when the thickness of said interface layer is assumed to be $l_G$, $\eta_{G1} = \eta_{G2}$ and $l_G = 500$ nm.

3. An optical system for altering the direction of the visual field in endoscopes according to claim 1, wherein:

said interface layer is formed with either one of a bonding agent, air, a vapor-deposition film and a glass plate.

4. An optical system for altering the direction of the visual field in endoscopes according to claim 1, wherein:

said interface layer is comprised of a layer of a bonding agent, a first vapor-deposition layer, a second vapor-deposition layer and a third vapor-deposition layer which are formed with mutually different materials, all of which layers being laminated together in this order, and when the refractive indices, respectively, of said layer of a bonding agent, said first vapor-deposition layer, said second vapor-deposition layer and said third vapor-deposition layer are assumed to be $\eta_c$, $\eta_a$, $\eta_g$ and $\eta_b$, respectively; and when the optical thicknesses of said first, second and third vapor-deposition layers are assumed to be $l_a$, $l_g$ and $l_b$, respectively; and when $\eta_{G1} = \eta_{G2} = \eta_G$, the following formulas are satisfied:

$\eta_c > \eta_a > \eta_g < \eta_b < \eta_G$
200 nm $\leq l_a \leq$ 350 nm
1000 nm $\leq l_g \leq$ 2000 nm
150 nm $\leq l_b \leq$ 300 nm.

5. An optical system for altering the direction of the visual field in endoscopes according to claim 1, wherein:

a diaphragm is substantially provided on said second light-emitting surface.

6. An optical system for altering the direction of the visual field in endoscopes according to claim 1, further comprising:

an adapter supporting said visual direction field altering means and removably mountable to the foremost end portion of said endoscope, said adapter being arranged so that, when said adapter is mounted onto said foremost end portion of the endoscope, the optical axis of said second light-emitting surface is brought into agreement with the optical axis of said objective lens system housed within said foremost end portion.

7. An optical system for altering the direction of the visual field in endoscopes according to claim 6, further comprising:

a parallel plate disposed adjacent to said first light-incidence surface and a lens bonded to said second light-emitting surface.

8. An optical system for altering the direction of the visual field in endoscopes according to claim 1, further comprising:

a positive lens disposed adjacent to said first light-incidence surface, and a negative lens bonded to said second light-emitting surface.

9. An optical system for altering the direction of the visual field in endoscopes according to claim 1, further comprising:

a negative lens disposed adjacent to said first light-incidence surface, and a positive lens disposed adjacent to said second light-emitting surface.

* * * * *